United States Patent
Kitayoshi

(12)
(10) Patent No.: US 6,198,539 B1
(45) Date of Patent: Mar. 6, 2001

(54) HOLOGRAM OBSERVATION METHOD AND HOLOGRAM OBSERVATION APPARATUS

(75) Inventor: Hitoshi Kitayoshi, Tokyo (JP)

(73) Assignee: Advantest Corporation (JP)

( * ) Notice: Subject to any disclaimer, the term of this patent is extended or adjusted under 35 U.S.C. 154(b) by 0 days.

(21) Appl. No.: 09/135,103

(22) Filed: Aug. 17, 1998

(30) Foreign Application Priority Data

Aug. 22, 1997 (JP) .................................................... 9-226601
Nov. 18, 1997 (JP) .................................................... 9-317418

(51) Int. Cl.[7] .................................................... G01B 9/02
(52) U.S. Cl. .......................... 356/457; 359/32; 342/179
(58) Field of Search .................................. 356/457, 458; 359/32; 342/179; 378/87

(56) References Cited

U.S. PATENT DOCUMENTS 5,736,958 * 4/1998 Turpin .................................. 342/179

FOREIGN PATENT DOCUMENTS 08201459 8/1996 (JP) .
09134113 5/1997 (JP) .
09153725 6/1997 (JP) .

OTHER PUBLICATIONS

Hitoshi Kitayoshi, High Resolution Technique for 2–D Complex Spectrum Analysis, Electronics Information Communication vol. J76–A No. 4 pp. 687–689, Apr., 1993.
Hitoshi Kitayoashi, Visualizing Electromagnetic Radiation and Propagation, Second Chapter "Principle of Visualization and Reconstruction Algorithm" in Doctoral Dissertation in Tohoku University, pp. 7–35, Feb., 1997.

* cited by examiner

Primary Examiner—Samuel A. Turner
(74) Attorney, Agent, or Firm—Knobbe, Martens, Olson & Bear, LLP

(57) ABSTRACT

Scanning sensor scans on a circumference and simultaneously a radiation wave is received by scanning sensor to generate received signal $S_m(f)$. A radiation wave is received by a fixed sensor at a position not changed with respect to the center of a circle with the circumference to generate received signal $S_r(f)$. The received signal $S_m(f)$ is made to interfere with the received signal $S_r(f)$ to acquire an interference signal. The interference signal is detected to obtain measured data $E(r,\phi)$ at each point on the circumference. Also, evaluation data $V(\phi')$ is calculated to estimate a direction of the radiation wave based on measured data $E(r,\phi)$ at each point.

15 Claims, 11 Drawing Sheets

NN is maximum value representable as flag value. Set data array as size of $x_n \times y_n \times z_n$ and $NN > x_n \times y_n \times z_n$

HOLOGRAM OBSERVATION METHOD AND HOLOGRAM OBSERVATION APPARATUS

BACKGROUND OF THE INVENTION

1. Field of the Invention

The present invention relates generally to an observation method and an observation apparatus for radio waves and acoustic waves, and more specifically, to an observation method and an observation apparatus which enables an observation without dead angle.

Also, the present invention relates to a multi-dimensional hologram data processing apparatus and a method for extracting a plurality of peak points for multi-dimensional hologram data and an area occupied thereby using the multidimensional hologram data processing apparatus.

2. Description of the Related Art

Since radio waves and acoustic waves are similarly waves, holograms of those waves can be observed as is the case with light and are utilized to visualize a wave source image and to specify noise (such as undesired electromagnetic wave radiation and ambient noise) sources. The inventors have disclosed a method and an apparatus for observing a radio wave hologram and acoustic wave hologram to derive a wave field intensity and wave source image, for example, in Japanese Laid-open Patent Application No. 8-201459 and Japanese Laid-open Patent Application No. 9-134113.

FIG. 1 is a schematic diagram for illustrating a hologram observation method described in Japanese Laid-open Patent Application No. 8-201459. Rectangular hologram observation surface 92 is set away from observation object (wave source) 91. Scanning sensor 93 which moves two-dimensionally in hologram observation surface 92 is used to detect radio waves and acoustic waves at a predetermined observation frequency from observation object 91 at each point in hologram observation surface 92. In addition, fixed sensor 94 is provided separately from scanning sensor 93 and is used to similarly detect radio waves and acoustic waves at the above-mentioned predetermined frequency from observation object 91. Signals from both sensors 93 and 94 are interfered with at interference unit 95 and the signals after interference is detected by detector 96. The detected signal (signal representing the correlation of the signals from both sensors 93 and 94, i.e. signal representing the hologram intensity at a position of scanning sensor 93 in hologram observation surface 92) is stored in memory 97 corresponding to the coordinates of scanning sensor 93 in hologram observation surface 92. When observations are completed at all observation points in hologram observation surface 92, data is read from memory 97 to reconstruct a hologram image by image reconstructing unit 98.

In the prior art hologram observation method as described above, however, plane scanning in the hologram observation surface is used to observe holograms, so that it is not possible to observe radio waves and acoustic waves arriving from the backside of the hologram observation surface. Additionally, it is difficult to observe radio waves and acoustic waves of extremely oblique incident angle with respect to the hologram observation surface. Thus, in reality, a field of view angle is as small as 120 degrees and the remaining angle distance of 240 degrees is a dead angle, which causes a disadvantage of a limited observation. A required observation can be made even with a relatively small field of view angle as described above, for example, when an observation object is placed at a corner of a room such as radio wave darkrooms and a hologram observation apparatus is placed at a corner opposite to the observation object. However, when an observation is made outdoors, radio waves and acoustic waves to be observed can not arrive only in a front direction. For this reason, many components of radio waves and acoustic waves, arriving other than in the front direction, are left without being observed, thus producing some space which can not be observed.

Furthermore, the prior art hologram observation method has a disadvantage of lacking a real-time basis observation since the hologram image is reconstructd after the data at all the observation points is acquired in the hologram observation surface.

Also, there are a circumference scanning type hologram observation for extracting each arrival angle (θ, φ') of a plurality of waves and a plane scanning type hologram observation for extracting each of the coordinates $(X_s, Y_s, Z_s)$ of a plurality of points wave sources illustrated in FIG. 2 (Hitoshi Kitayoshi: "Study for visualizing electromagnetic radiation and propagation", second chapter "principle of visualization and reconstruction algorithm" in doctoral dissertation in Tohoku University, February 1997).

Hologram observation data has an accuracy equal to or greater than the observed dimensions, for example, a three-dimensional image can be reconstructd from data recorded in a two-dimensional plane. However, the reconstructd image has a limited resolution due to a limitation of an observation surface as described in the above-mentioned literature for the plane scanning type hologram observation (Hitoshi Kitayoshi: "Study for visualizing electromagnetic radiation and propagation", second chapter "principle of visualization and reconstruction algorithm" in doctoral dissertation in Tohoku University, February 1997, pp.13–19). Thus, when a plurality of wave sources are simultaneously observed, it is substantially difficult to automatically extract the position and intensity of each wave source.

Conventionally, a contour line processing method and a path survey method are used to detect peaks and an area occupied by the peaks as shown in FIG. 3. The path survey method is one for surveying the negative inclination path from a peak point in all moving directions to determine an area occupied by the point.

The above-mentioned prior art has disadvantages as described below.

Specifically, in the above-mentioned algorithm, the creation of a path for survey is complicated and is not easily implemented by simple hardware or digital signal processing (DSP).

Although another approach is also contemplated in which a reconstructd image is improved in extended peak (blurred image) by modifying a reconstructing algorithm for hologram images, the approach is not complete in the relationship between parameters used when applying the algorithm and the stability of the reconstructd image (Hitoshi Kitayoshi: "Study for visualizing electromagnetic radiation and propagation", second chapter "principle of visualization and reconstruction algorithm" in doctoral dissertation in Tohoku University, February 1997, pp.20–35). The parameter refers to a threshold value in SPIM (Spectrum Phase Interpolation Method) (Hitoshi Kitayoshi: "higher resolution for short time frequency spectrum analysis" Shingakuron A, vol.J76-A, no.1, pp.78–81, January 1993., Hitoshi Kitayoshi: "higher resolution for two-dimensional complex spectrum analysis" Shingakuron A, vol.J76-A, no.4, pp.687–689, April 1993), while the parameter refers to a filter terms number and the like in MEM (Maximum Entropy Method)

(Mikio Hino: "Spectrum analysis" Asakura Syoten, 1977, Yoshinao Aoki: "Wave signal processing" Morikita Pub., sixth chapter "Maximum Entropy Method", 1986).

SUMMARY OF THE INVENTION

In view of the above-mentioned disadvantages in the prior art, it is an object of the present invention to provide a hologram observation method and apparatus which can have 360 degrees of a viewing angle without dead angle and make a real-time evaluation for the propagation of radio waves and acoustic waves.

It is another object of the present invention to provide a multi-dimensional hologram data processing apparatus which can be implemented by a hardware or digital signal processing (DSP) with a simple algorithm and a method for extracting a plurality of peak points for multi-dimensional hologram data and an area occupied thereby using the multi-dimensional hologram data processing apparatus.

The present invention provides a hologram observation method for measuring radiation waves from an observation object to reconstruct a hologram, wherein while a first sensor scans on a circumference, a radiation wave is received by the first sensor to generate a first received signal, the radiation wave is received by a second sensor at a position not changed with respect to the center of a circle with the circumference to generate a second received signal, the first received signal is made to interfere with the second received signal to acquire an interference signal, the interference signal is detected to obtain measured data at each point on the circumference.

In the observation method according to the present invention, it is preferable to calculate evaluation function $V(\phi')$ based on measured data $E_z(r, \phi)$ at each point in a range of half of the circumference with the following equation:

$$V(\phi') = \int_{-\pi/2}^{+\pi/2} W(\phi) e^{-2\pi j r \sin\theta \cos(\phi)/\lambda} E_z(r, \phi + \phi') d\phi$$

to estimate orientation $\phi'$ of the radiation wave. In the equation 3, rotation angle $\phi$ represents a point on the circumference, r represents a radius of the circle, j represents an imaginary unit, $\pi$ represents ratio of circumference of circle to its diameter, $\phi$ represents a rotation angle at a position of the center in the range of the half of the circumference, $\lambda$ represents a wavelength of the radiation wave, $\theta$ represents an incident angle of radiation wave with respect to the central axis of the circle, and $W(\phi)$ represents a predetermined weighting function. In this event, a peak in evaluation function $V(\phi')$ can be selected to calculate incident angle $\theta$ from an optimal value for $r \cdot \sin\theta$. Alternatively, evaluation function $V(\phi')$ may be calculated while a rotation axis direction of the circle is changed such that the incident angle is equal to 90 degrees.

In the hologram observation method according to the present invention, it is preferable that the acquisition of the measured data is continuously executed by continuously moving the first sensor on the circumference and evaluation function $V(\phi')$ is continuously calculated based on the measured data for the half of the circumference out of the previously obtained measured data. In such a case, it is desirable that the present rotation angle of the first sensor is not included in the angle range of the half of the circumference for calculating evaluation function $V(\phi')$. Also, an image in a direction of rotation angle $\phi'$ may be photographed and the photographed image is displayed together with a display representing the calculated evaluation function $V(\phi')$.

The present invention provides a hologram observation apparatus for observing a radiation wave from an observation object to reconstruct a hologram, and has a scanning sensor for receiving the radiation wave to generate a first received signal; a driving means for driving the scanning sensor to perform scanning on the circumference; a fixed sensor placed at a position not changed with respect to the center of the circle for receiving the radiation waves to generate a second received signal; an interference unit for interfering with the first received signal and the second received signal to output an interference signal; and a detector for detecting the interference signal to output measured data at each point on the circumference. In this observation apparatus, a trigger timing for measurement may be determined based on an ID signal extracted from the second received signal. Additionally, the observation apparatus may have a level detecting means for calculating an average signal level from the second received signal and a level calibration unit for calibrating levels of the measured data based on the average signal level.

Furthermore, the observation apparatus preferably have a ring data buffer memory written with the measured data into an address in accordance with the present rotation angle of the scanning sensor corresponding to the circumference. It is also preferable for the observation apparatus to include an evaluation value calculating unit for calculating evaluation function $V(\phi')$ based on measured data $E_z(r,\phi)$ at each point in the above-mentioned range of the half of the circumference stored in the ring data buffer memory with the following equation:

$$V(\phi') = \int_{-\pi/2}^{+\pi/2} W(\phi) e^{-2\pi j r \sin\theta \cos(\phi)/\lambda} E_z(r, \phi + \phi') d\phi$$

where rotation angle $\phi$ represents a point on the circumference, r represents a radius of the circle, j represents an imaginary unit, $\pi$ represents ratio of circumference of circle to its diameter, $\phi'$ represents a rotation angle at a position at the center in the range of the half of the circumference, $\lambda$ represents a wavelength of the radiation wave, $\theta$ represents an incident angle of the radiation wave with respect to a plane of the circumference, and $W(\phi)$ represents a predetermined weighting function. In this event, it is preferable to provide an offset adding unit for adding an angle distance difference for the half of the circumference to the present rotation angle of the scanning sensor to generate rotation angle $\phi'$. Moreover, the observation apparatus preferably have a TV camera rotatively driven by driving means together with the scanning sensor while the TV camera maintains an angle distance difference for the half of the circumference with respect to the scanning sensor, and a display unit for making a display of a photographed image by the TV camera, a display based on the measured data, and a display based on the evaluation function.

The principle of the hologram observation according to the present invention will be hereinafter described. Three-dimensional xyz rectangular coordinates are set, in which and observation point P is arranged at distance r from origin O in xy plane. Observation point P can rotate around origin O and a rotation angle of observation point P measured with respect to x axis is represented by $\phi$. A zenith angle (incident angle) of wave source S measured with respect to z axis is represented by $\theta$. Here, assuming that a plane wave from wave source S enters observation point P.

As shown in FIG. 4(a) and FIG. 4(b), a cylindrical coordinates representation of the Maxwell equation is applied to the plane wave traveling in a direction making angle θ against z axis with y axis representing magnetic field H to derive a z axis component of an electric field, i.e. $E_z$ component, as follows:

$$E_z(r, \phi) = A_o e^{jkz\cos\theta} \cdot \sin\theta \sum_{n=-\infty}^{\infty} (j)^n J_n(kr\sin\theta)e^{jn\phi} \quad (1)$$

where j represents the imaginary unit, $J_n$ represents the Bessel function, and $k=2\pi/\lambda$, $\lambda$ represents a wavelength of the wave to be observed.

Expression (1) can be developed using the Jacobi development formula as follows:

$$E_z(r,\phi) = A_o e^{jkz \cos\theta} \cdot \sin\theta e^{jkr \sin\theta \cos\phi} \quad (2)$$

Electric field $E_z$ on the circumference when Z=0 is derived as follows:

$$E_z(r,\phi) = A_o \sin\theta e^{jkr \sin\theta \cos\phi} \quad (3)$$

Assuming that an incident angle of the plane wave with respect to a direction of x axis is $\phi_i$, expression (3) can be transformed as follows:

$$E_z(r,\phi) = A_o \sin\theta e^{jkr \sin\theta \cos(\phi-\phi_i)} \quad (4)$$

In expression (4), it is assumed that $A_O$, θ, and $\phi_i$ are unknown and only electric field $E_z(r, \phi)$ on the circumference at distance r from origin O can be observed in plane z=0 (xy plane). Here, evaluation function $V(\phi')$ is defined as follows:

$$V(\phi') = \int_{-\pi/2}^{\pi/2} W(\phi)e^{-jkr'\cos\phi} E_z(r, \phi + \phi')d\phi \quad (5)$$

Here, W(φ) is a weighting function for the purpose of stabilization (decreasing cut-off error) of evaluation function $V(\phi')$. For example, assuming $$W(\phi) = \frac{1}{\pi}(1 + \cos(2\phi)), \quad (6)$$

then $$\int_{-\pi/2}^{\pi/2} W(\phi)d\phi = 1 \quad (7)$$

is derived, i.e. it can be a standardized weighting function.

When expression (4) is substituted into expression (5), the following is derived.

$$V(\phi') = \int_{-\pi/2}^{\pi/2} W(\phi)e^{-jkr'\cos\phi} A_o \cdot \sin\theta e^{jkr\sin\theta\cos(\phi+\phi'-\phi_i)}d\phi \quad (8)$$

In expression (8), assuming that weighting function W(φ) is a standardized weighting function as shown in expression (6) and r'=r·sin θ, then the following is obtained when $\phi'=\phi_i$;

$$V(\phi_I) = A_O \cdot \sin\theta$$

Also, as is apparent from expression (8), $V(\phi')$ takes a maximum value under the condition of r'=r·sin θ and $\phi'=\phi_i$. If the following $$a = \frac{r'}{r}$$

is assumed and arbitrary real number a satisfying 0<a≦1 is applied to evaluate $V(\phi')$ to find the maximum value, θ, $A_O$, and $\phi_I$ can be all derived respectively from;

$$\theta = \sin^{-1}a$$

$$A_o = \frac{(\text{peak of } V(\phi'))}{a}$$

$\phi_i = (\phi' \text{ providing peak})$

Incidentally, $A_O$ is a correction term for an evaluation amplitude with sin θ.

An exponential function term (exp term) in the expression (8), i.e. vibration term for integrand is expressed as follows;

$$e^{jk(r \sin\theta \cos(\phi+\phi'-\phi_i)-r' \cos\phi)}$$

If r>>λ, the value is substantially zero since expression (8) is an integral for the vibration solution unless "r'=r·sin θ and $\phi'=\phi_i$". On the other hand, when "r'=r·sin θ and $\phi'=\phi_i$", non vibration solution $e^0=1$ is obtained to provide a peak.

Here, the result of expression (8) verified by a computer simulation will be described.

FIG. 5 shows a graph illustrating the result of estimating expression (8) using an electric field observed when $A_O \cdot \sin\theta=1$ for each wave source and a total of four wave sources S are arranged at $\phi_i$=45 degrees, 135 degrees, 225 degrees, and 315 degrees, respectively, with a horizontal axis representing angle φ, and a vertical axis DOA (Direction of Arrival) evaluation value. In this graph, a solid line represents the result when θ for all the wave sources is 45 degrees while a dotted line represents the result when θ for each wave source is changed in a range from 90 degrees to 30 degrees. In evaluating expression (8), r'=r·sin (45 degrees). Also, r=100 cm and λ=15 cm.

As is apparent from FIG. 5, directions of a plurality of wave sources can be efficiently and IF) accurately isolated according to the method of the present invention. Even when incident angle θ with respect to z axis is unknown, θ can be estimated by changing r' in expression (8) to consider the peak level and the extended spectrum with respect to angle φ. In this event, it is effective, for example, that all the spectrums with respect to angle φ in expression (8) are once derived with r'=r, and a maximum evaluation value is derived within a range of 0<r'≦r only for some peaks, from the fact that the peak position is not changed irrespective of θ. The spectrum here refers to a graph representing a change of the evaluation value with respect to rotation angle φ.

Additionally, it is also possible to evaluate the component of rotation angle φ for electric field E, i.e.

$E_\phi$.

When the component of $E_\phi(r,\phi)$ on the circumference with radius r in plane z=0 is assumed as follows;

$$E_\phi(r,\phi) = A_o \cos\theta e^{jkr \sin\theta \cos\phi} \quad (9)$$

and considered as follows;

$$W(\phi) = 1/\pi(1+\cos(2\phi))\cdot\cos\phi \quad (10)$$

then, it can be treated similarly to expression (5). In this case, however, the correction for the evaluation amplitude with sin θ is not required.

Next, a multi-dimensional hologram data processing apparatus according to the present invention has an N-dimensional data array memory for writing an N-dimensional array data therein; an N-dimensional flag array memory for writing an N-dimensional array flag value therein; an N-dimensional array address generating unit for generating addresses for the N-dimensional array data; and a digital signal processing unit for controlling the N-dimensional array address generating unit, executing an algorithm, and outputting a peak point detection value and area detection value.

A method for extracting a plurality of peak points for multi-dimensional hologram data and an area occupied by the peak points using the multi-dimensional hologram data processing apparatus according to the present invention has:

a first step of setting all contents of the N-dimensional flag array memory to zero using the N-dimensional array address generating unit;

a second step of specifying a value of the N-dimensional array data providing a maximum value and an address value of the N-dimensional array data providing the maximum value in addresses in which the flag value represents zero using the N-dimensional array address generating unit, and proceeding to next step when one or more addresses in which the flag value represents zero are present and terminating the processing when no address representing a flag value of zero is present;

a third step of setting the flag value to zero and setting the content of the N-dimensional flag array memory of the above-mentioned address value to zero, and outputting the value of the N-dimensional array data providing the maximum value and the address value of the N-dimensional array data providing the maximum value as a peak point detection value;

a fourth step of setting a counter to zero;

a fifth step of specifying an address value in which the content of the N-dimensional flag array memory coincides with the flag value for all the addresses using the N-dimensional array address generating unit;

a sixth step of generating all address values tangent to a circumferential direction centered on the address value specified in the fifth step, adding 1 to the counter when the content of the N-dimensional flag array memory for the generated address value coincides with zero and the value of the N-dimensional array data value for the generated address value is smaller than the N-dimensional array data value for the address value specified in the fifth step, and rewriting the content of the N-dimensional flag array memory for the generated address value into the value obtained by adding 1 to the flag value;

a seventh step of determining whether the counter is equal to zero or not, and when not, adding 1 to the flag value for a new flag value and returning to the fourth step when the counter is not equal to zero, and proceeding to the next step when the counter is equal to zero; and an eighth step of rewriting the content of the N-dimensional flag array memory into a maximum value representable as a flag value for all the addresses and outputting the address value thus obtained as an area address using the N-dimensional array address generating unit when the content of the N-dimensional flag array memory is other than zero and does not coincide with the maximum value representable as a flag value, returning to the second step from the eighth step to repeat each step thereafter.

A hysteresis level may be set in the sixth step of generating all address values tangent to the circumferential direction centered on the address value specified in the fifth step.

The N-dimensional array data may be represented in a spherical coordinate system or a cylindrical coordinate system, and the end continuity may be maintained at the sixth step of generating all the address values tangent to the circumferential direction centered on the address value specified in the fifth step.

Therefore, the multi-dimensional hologram data processing apparatus and the method using the same for extracting a plurality of peak points for the multi-dimensional hologram data and the area occupied by the peak points can be used to facilitate the implementation of hardware and digital signal processing (DSP) with a simple algorithm, and achieve the processing at a speed hundred times faster than the prior art.

DETAILED DESCRIPTION OF THE PREFERRED EMBODIMENTS

Figure 6:
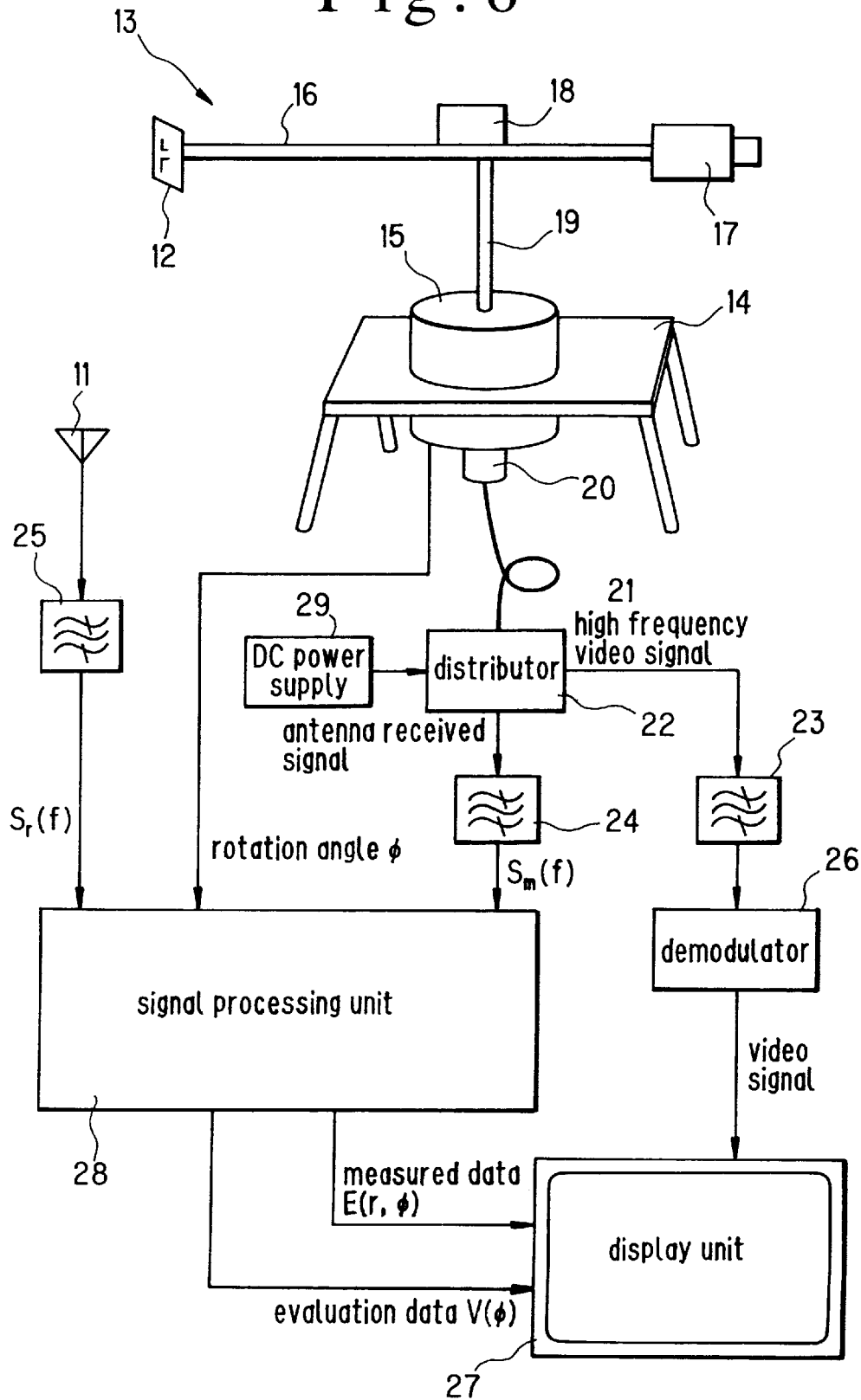
FIG. 6 is a diagram illustrating the configuration of a circumference scanning type hologram observation apparatus according to one embodiment of the present invention.
Figure 7:
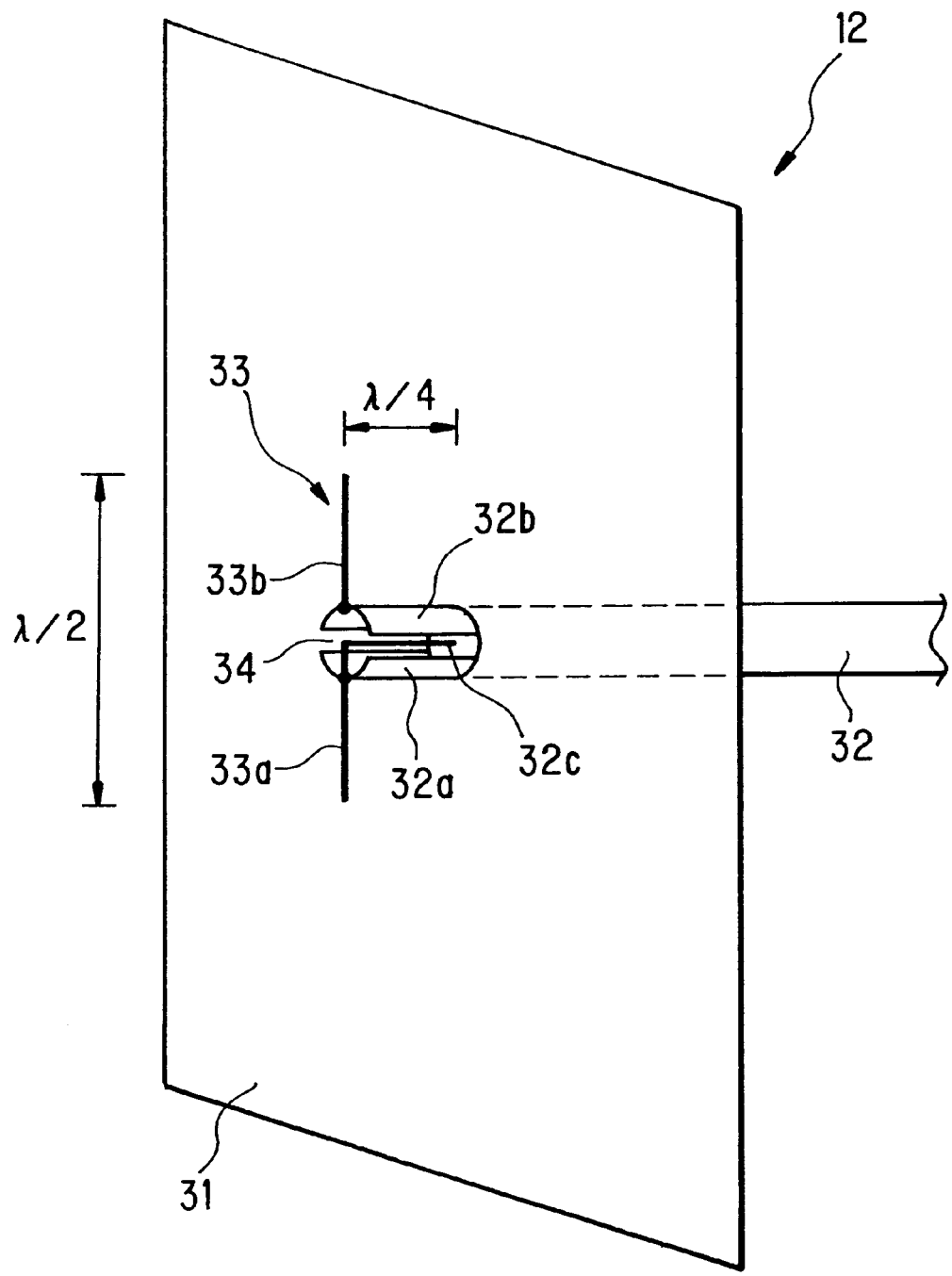
FIG. 7 is a diagram illustrating an exemplary scanning antenna.
Figure 8:
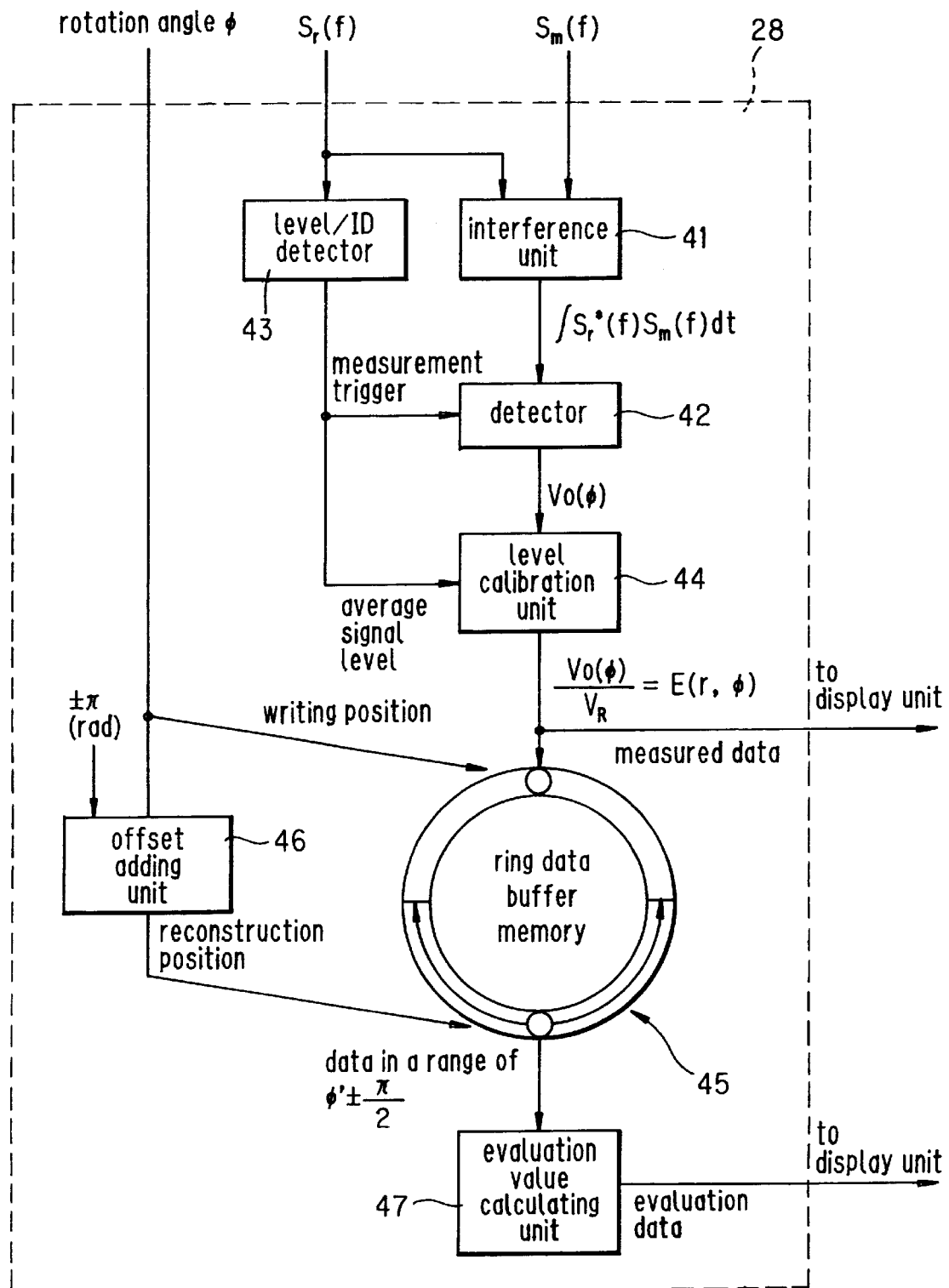
FIG. 8 is a block diagram illustrating the configuration of a signal processing unit portion of the apparatus shown in FIG. 6.

Next, preferred embodiments according to the present invention will be described with reference to the drawings. FIG. 6 is a diagram illustrating the configuration of a circumference scanning type hologram observation apparatus according to one embodiment of the present invention; FIG. 7 is a perspective view illustrating an exemplary configuration of a scanning antenna; FIG. 8 is a block diagram illustrating the configuration of a signal processing unit portion of the circumference scanning type hologram observation apparatus. Although description is made when a radio wave hologram is observed, an acoustic wave hologram can be measured with a similar configuration to that described below. Since the radio wave hologram is observed, an antenna serves as a sensor for detecting waves from an observation object.

Figure 1:
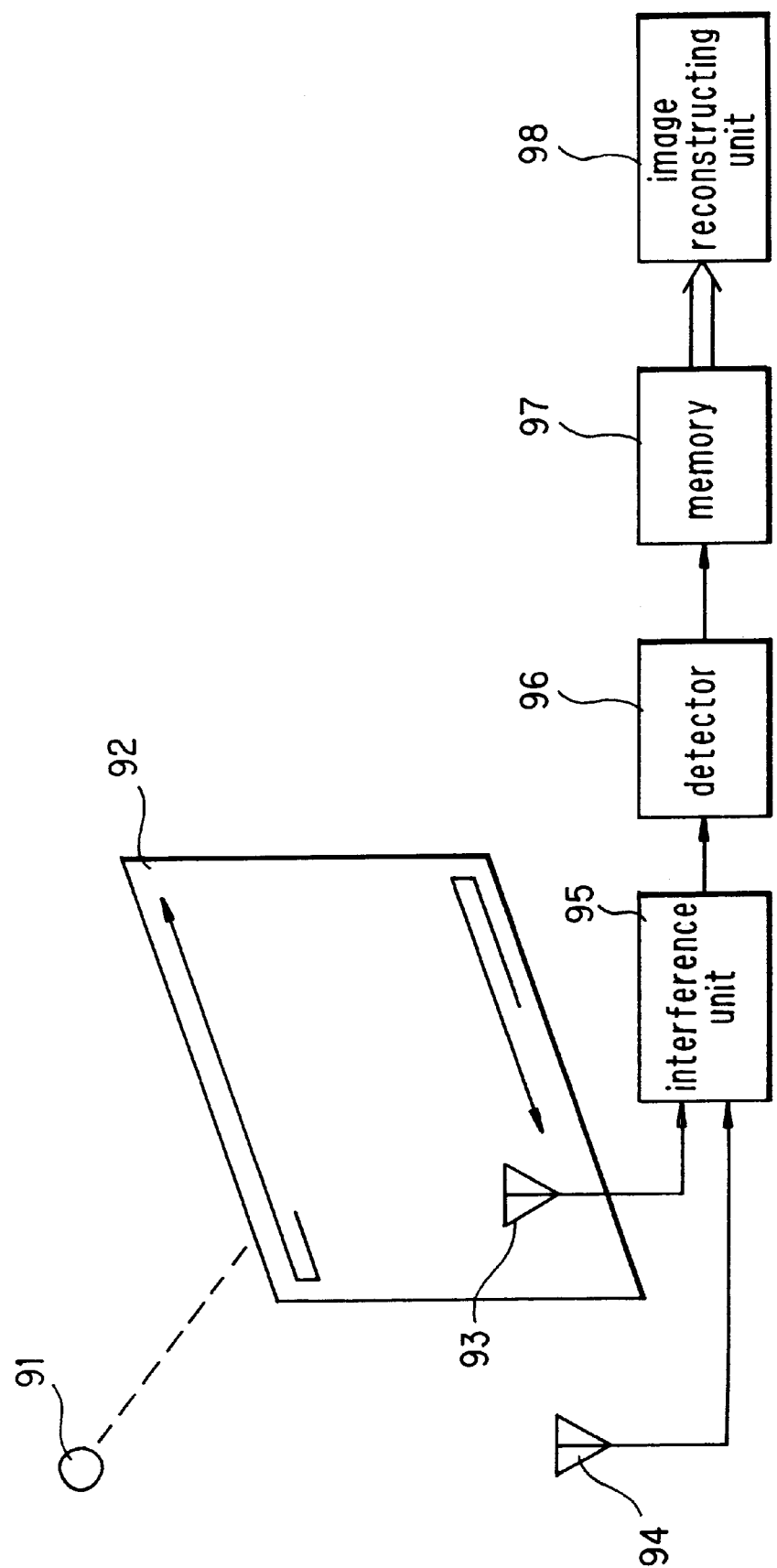
FIG. 1 is a block diagram illustrating the configuration of a prior art hologram observation apparatus.
Figure 2:
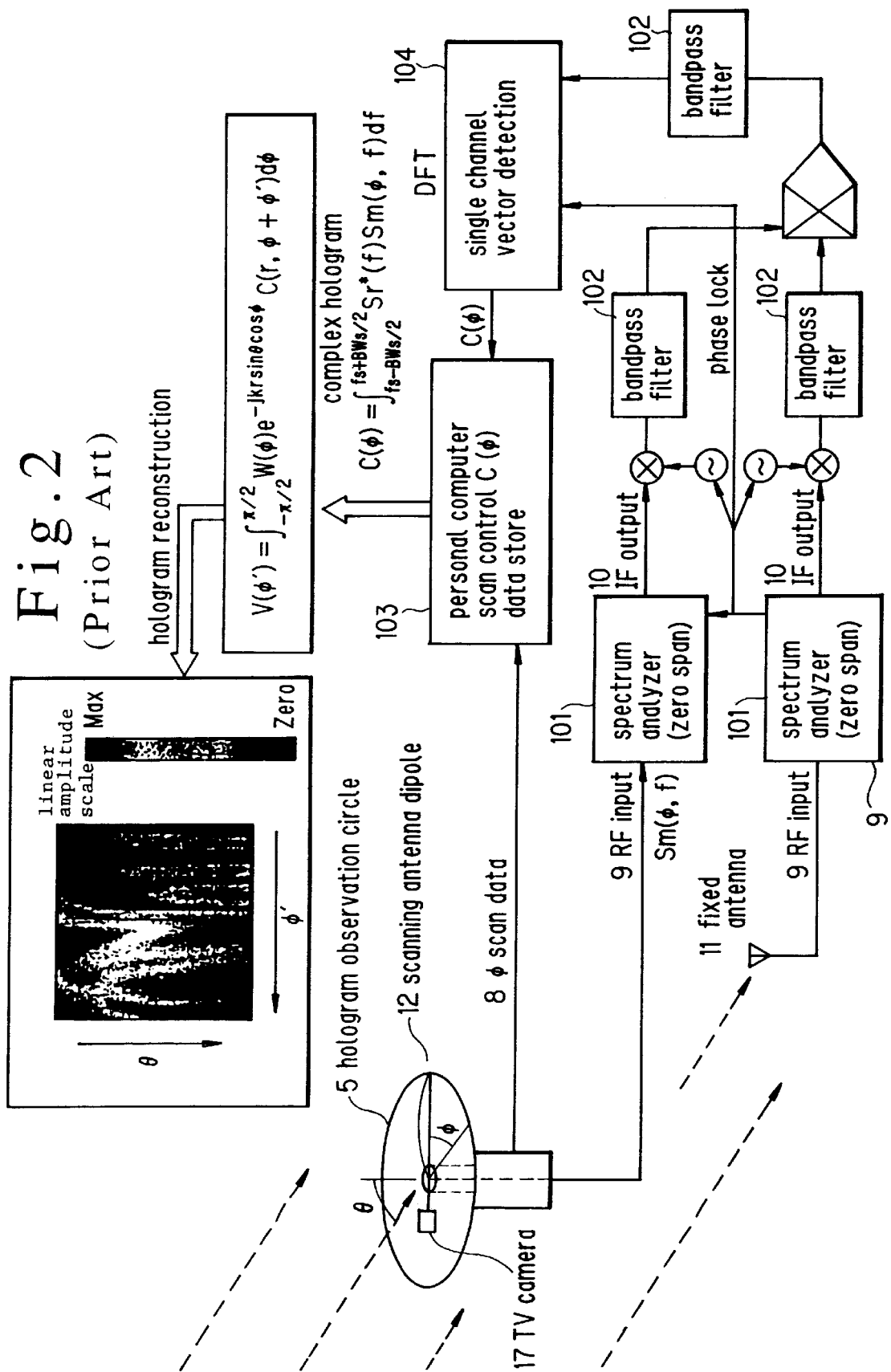
FIG. 2 is a diagram illustrating a circumference scanning type hologram observation apparatus and a method for reconstructing a hologram.
Figure 3:
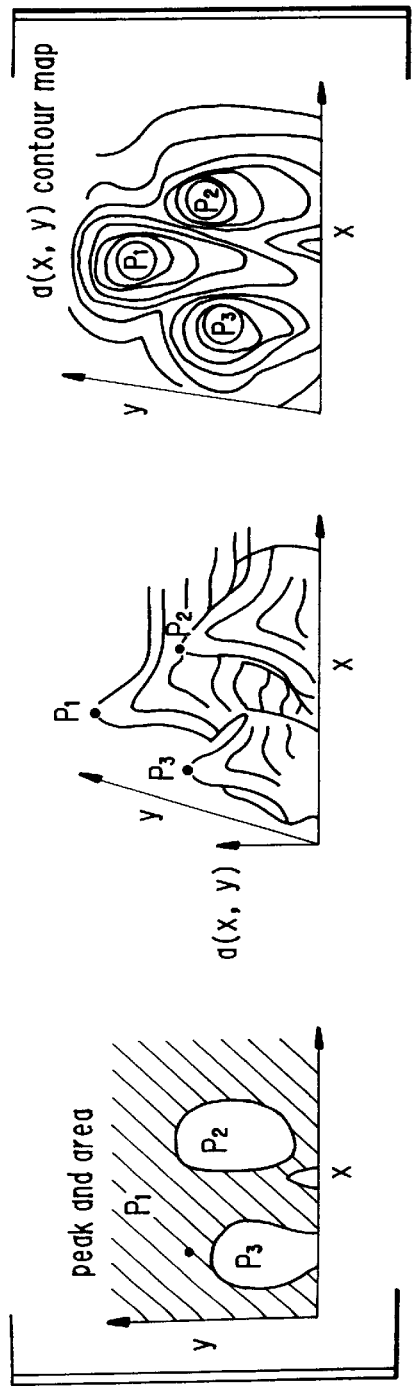
FIG. 3 is a diagram illustrating a contour line processing method and a path survey method in the prior art.
Figure 4:
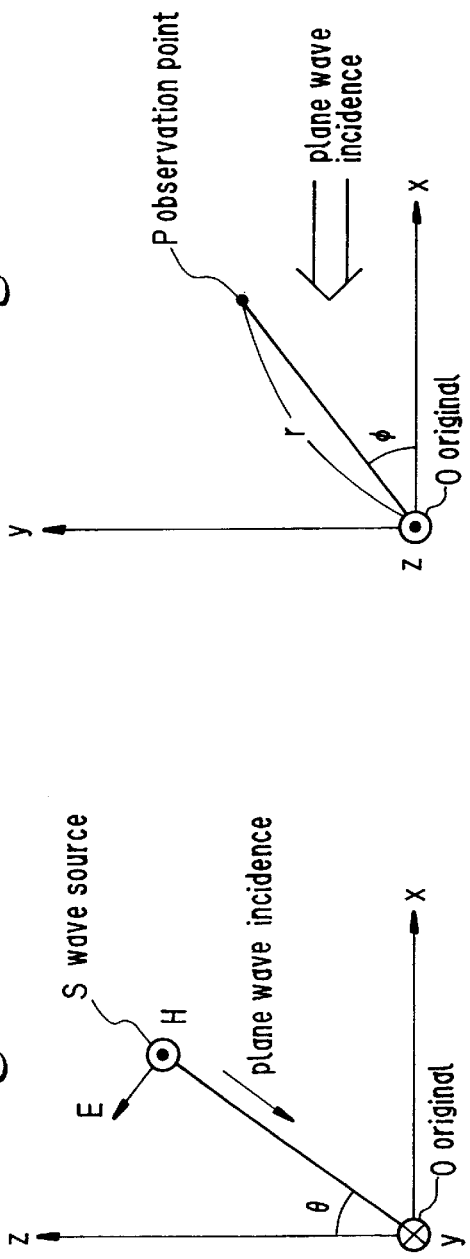
FIG. 4(a), FIG. 4(b) are diagrams illustrating the relationship of an xyz rectangular coordinate system, wave source and observation point.
Figure 4:
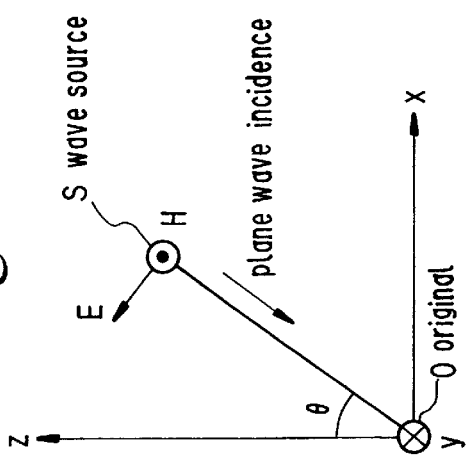
Figure 5:
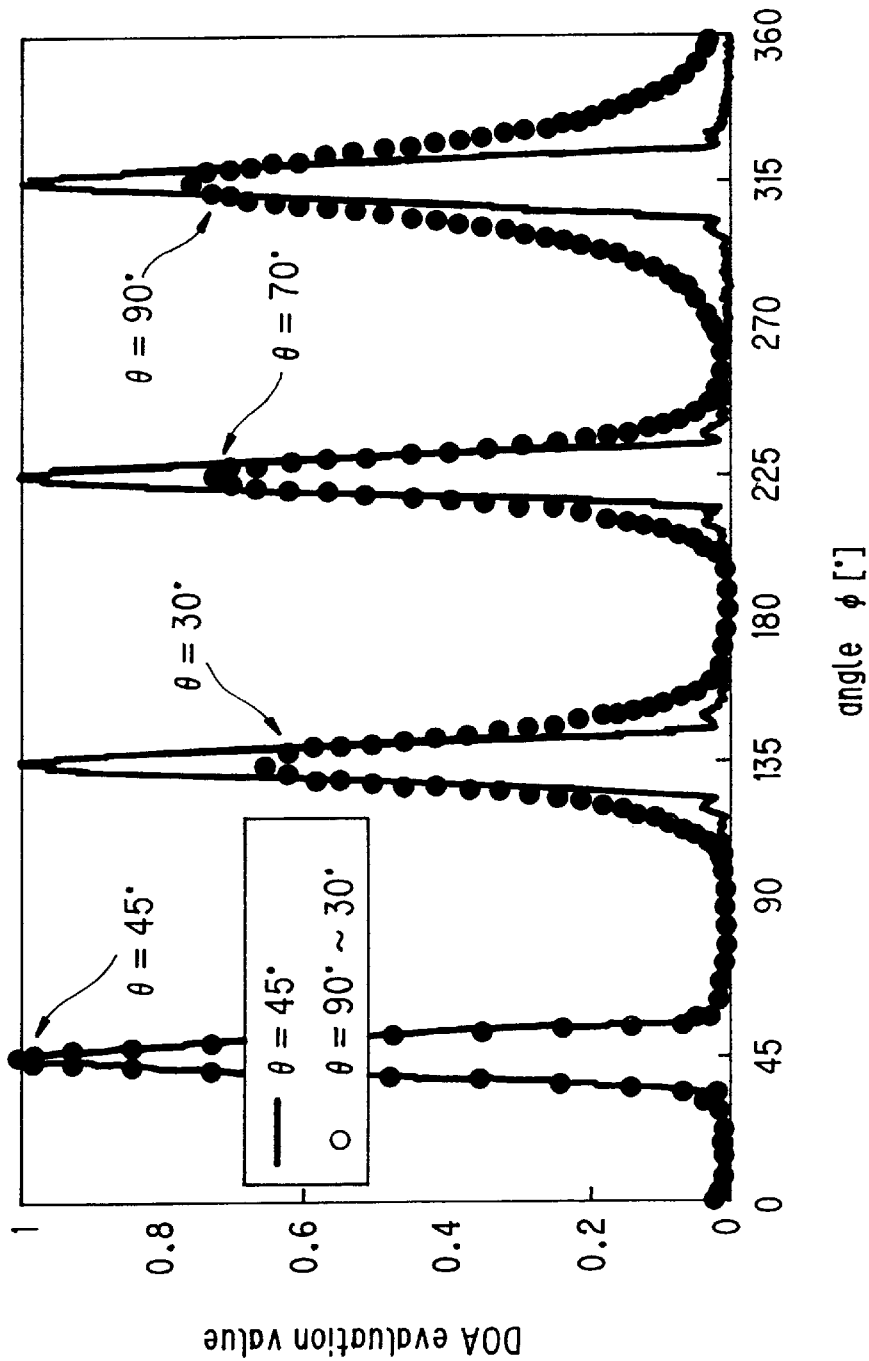
FIG. 5 is a graph illustrating the simulation result for the relationship between rotation angle $\phi$ and an evaluation value.

The circumference scanning type hologram observation apparatus also has fixed antenna 11 and scanning antenna 12 similarly to the prior art hologram observation apparatus shown in FIG. 1. Scanning antenna 12, however, differs from the scanning antenna in the prior art observation apparatus in that scanning antenna 12 is placed above observation bench 13 and is rotated on a circumference of a circle with radius r for scanning. In other words, the scanning antenna 12 performs circumference scanning.

Observation bench 13 has pedestal 14 and motor 15 mounted on pedestal 14 for rotating beam member 16 in a horizontal plane, and scanning antenna 12 is mounted at one end of beam member 16. At the other end of beam member 16, TV (television) camera 17 is mounted for photographing the scenery around. Also, directional coupler 18 is provided on beam member 16 for synthesizing a received signal from scanning antenna 12 and a high frequency video signal from TV camera 17. Since a frequency band of a radio wave to be observed differs from that of the high frequency video signal, the received signal and the high frequency video signal can be later divided even if both signals are synthesized by directional coupler 18.

Beam member 16 is supported near a position which maintains the balance of the weights of scanning antenna 12, TV camera 17, and directional signal coupler 18 mounted thereon at one end of rotation axis 19 of motor 15. Scanning antenna 12 is placed at distance r from the point supporting beam member 16 by rotation axis 19, and is revolved by the rotation of rotation axis 19 along the circumference of the circle with radius r in the horizontal plane. Rotation axis 19 has the inside of a coaxial line, and has the other end provided with coaxial rotary joint 20 such that a signal from directional signal coupler 18 is drawn to the outside by coaxial cable 21 through the coaxial line within rotation axis 19 and coaxial rotary joint 20. Motor 15 has a rotation angle sensor and a signal representing rotation angle $\phi$ of rotation axis 19 is outputted from motor 15. Rotation angle $\phi$ of rotation axis 19 directly represents a rotation angle (position angle) of scanning antenna 12.

The configuration of scanning antenna 12 will be described in the following. As is apparent from the description of the principle as mentioned above, z axis component $E_z$ of electric field E is to be observed, so that a vertical half-wavelength dipole antenna, for example, is used as scanning antenna 12. For scanning antenna 12, a probe antenna with reflecting plate which the inventors have disclosed in Japanese Laid-open Patent Application No. 9-153725 is preferably used. FIG. 7 is a perspective view illustrating scanning antenna 12 to which the probe antenna described in Japanese Laid-open Patent Application No. 9-153725 is applied.

Rectangular reflecting plate 31, made of metal, has each side with a length of at least $2\lambda$, assuming that a wavelength of the radio wave to be observed is $\lambda$. One end of coaxial cable 32 is inserted straight into a substantially central point of reflecting plane 31 from the backside thereof. The projecting portion of coaxial cable 32 from reflecting plane 31 has a length of approximately $\lambda/4$. An outer conductor of coaxial cable 32 is electrically connected to reflecting plane 31 at the point where coaxial cable 32 penetrates through reflecting plane 31. In the projecting portion of coaxial cable 32 from the penetrating point to an end thereof, the outer conductor of coaxial cable 32 is divided into two, i.e. outer conductor piece 32a and 32b by a pair of slit portions 34 extending in a projecting direction of coaxial cable 32. Half-wavelength dipole antenna 33, parallel to reflecting plane 31, is connected to the end of coaxial cable 32 so as to be centre-fed. More specifically, an end of one element 33a of dipole antenna 33 is connected to an end of the one outer conductor piece 32a, and an end of the other element 33b is connected to an end of the other outer conductor piece 32b. Additionally, central conductor 32c of coaxial cable 32 is connected to the end of the one element 33a. In scanning antenna 12 mentioned above, the one outer conductor piece 32a serves as distributed constant type balun of quarter wavelength to perform balanced-to-unbalanced transformation. Also, reflecting plane 31 is provided to apparently generate a mirror image signal source to improve gain in the front direction of the antenna as well as reduce directional gain in the back direction.

Coaxial cable 21 from coaxial rotary joint 20 is inputted to distributor 22. Distributor 22 divides the received signal of scanning antenna 12 and the high frequency video signal synthesized in directional signal coupler 18. Distributor 22 is also connected to direct-current (DC) power supply 29. Direct-current power supply 29 is provided to supply the supply voltage to TV camera 17 and a preamplifier portion of scanning antenna 12 (not shown). The direct-current power from direct-current power supply 29 is supplied to directional signal coupler 18 through coaxial cable 21, coaxial rotary joint 20, and the coaxial line within rotation axis 19 and is divided in directional signal coupler 18 to be sent to the preamplifier portion of scanning antenna 12 and TV camera 17.

Of the signals divided in distributor 22, the high frequency video signal component is inputted to demodulator 26 through bandpass filter (BPF) 23, and the demodulated output from demodulator 26 is inputted to display unit 27. Of the signals divided in distributor 22, the component of the signal received at scanning antenna 12 is inputted to bandpass filter 24 to be limited in a predetermined observation frequency band, and then inputted to signal processing unit 28 as received signal $S_m(f)$. A signal received at fixed antenna 11 is amplified in a preamplifier unit, not shown, and then inputted to bandpass filter 25 to be limited in the same observation frequency band as that in the signal received at scanning antenna 12, and inputted to signal processing unit 28 as received signal $S_r(f)$ Signal processing unit 28 is also inputted with a signal representing rotation angle $\phi$ of rotation axis 19. Measured data and evaluation data are outputted to display portion 27 from signal processing unit 28, later described.

FIG. 8 is a block diagram illustrating the internal configuration of signal processing unit 28. Signal processing unit 28 has interference unit 41 for making received signal $S_r(f)$ from fixed antenna 11 interfere with received signal $S_m(f)$ from scanning antenna 12 to generate interference signal expressed as follows;

$$\int S_r^*(f) S_m(f) dt$$

and detector 42 for complex-detecting an output signal from interference unit 41 to output detection signal $V_O(\phi)$; level/ID detector 43 for demodulating received signal $S_r(f)$ from fixed antenna 11 to derive average signal level $V_{RX}$ as well as detect an ID (identification) signal in the received signal for use as a measurement trigger; level calibration unit 44 for performing level calibration by dividing detection signal $V_O(\phi)$ by average signal level $V_R$ to output the result as measured data $E(r, \phi)$; and ring data buffer memory 45 for storing measured data $E(r,\phi)$ for each rotation angle, i.e. for each measurement point. Here, t represents a time variable and * represents a complex conjugate. Each memory address in ring data buffer memory 45 corresponds to each observation point on the circumference used in the circumference scanning. Thus, by providing one rotation angle $\phi$ at an observation point as an address, it is possible to access data in ring data buffer memory 45 corresponding to that rotation angle $\phi$. The measurement trigger is used to control a trigger timing for measurement at detector 42. Incidentally, a multiplier and a vector detector, disclosed as a correlation function measurement apparatus in Japanese Laid-open Patent Application No. 9-133721 by the present inventors, are preferably used for interference unit 41 and detector 42.

When a hologram image is reconstructd for radio waves continuously emitted, it is not required to detect ID signal and the like as a trigger timing for measurement. However, when a hologram image is reconstructd for radio waves intermittently emitted, it is required to perform measurement in accordance with the timing of emission, thereby using the ID signal detected in the received signal. For the ID signal, for example, a unique word portion including a known code from a known radio transmitting station is used, or switching information of a channel central frequency is used when a frequency hop TDMA (Time Division Multi Access) is applied.

A writing position into ring data buffer memory 45 is determined by a signal representing rotation angle $\phi$ of rotation axis 19. In this circumference scanning type hologram observation apparatus, data is read in a range of 180 degrees centered on a position (reconstruction position $\phi'$) opposite to the above-mentioned writing position $\phi$ on the circumference, i.e. each 90 degrees range centered on the position $\phi'$ ($=\pi/2$rad) from ring data buffer memory 45. The read data is subject to the processing in accordance with the above-mentioned expression (5) to obtain evaluation data $V(\phi')$. For this reason, signal processing unit 28 further has offset adding unit 46 for adding an offset of $\pm 180$ degrees ($=\pm\pi$ rad) to rotation angle $\phi$ to calculate reconstruction position $\phi'$, and evaluation value calculating unit 47 for reading data in the range of $\phi'\pm 90$ degrees from ring data buffer memory 45 to perform the processing of expression (5), thereby calculating evaluation data $V(\phi')$.

Next, the operation of the circumference scanning type observation apparatus will be described.

By driving motor 15, rotation axis 19 is rotated at each predetermined speed to rotate beam member 16 associated therewith, causing scanning antenna 12 to perform the circumference scanning. At this event, TV camera 17 photographs the scenery around in the opposite direction by an angle of 180 degrees against scanning antenna 12, with being rotated similarly to scanning antenna 12. The present rotation angle $\phi$ of scanning antenna 12 is always communicated from motor 15 to signal processing unit 28.

A signal received at scanning antenna 12 passes through distributor 22 and bandpass filter 24, and is inputted to interference unit 41 as received signal $S_m(f)$ with its frequency limited to the predetermined observation frequency band, where f represents an observation frequency. A signal receive at fixed antenna 11 also passes through bandpass filter 25 to be similarly limited in frequency, and is inputted to interference unit 41 as received signal $S_r(f)$. Interference unit 41 outputs an interference signal for the two received signals $S_m(f)$, $S_r(f)$, expressed by the following;

$$\int S_r^*(f)S_m(f)dt$$

The interference signal is subject to complex detection by detector 42 to generate detection signal $V_O(\phi)$ which is calibrated in level calibration apparatus 44 with average signal level $V_R$ to generate measured data $E(r,\phi)$ for the present rotation angle $\phi$. Measured data $E(r,\phi)$ is written into an address corresponding to the present rotation angle $\phi$ in ring data buffer memory 45 and is outputted to display unit 27. At the same time, based on reconstruction position $\phi'$ obtained by calculating an offset of $\pm 180$ degrees to the present rotation angle $\phi$, data in a range of reconstruction position $\phi'\pm 90$ degrees is read from ring data buffer memory 45. Evaluation value calculating unit 47, based on the read data, processes in accordance with the above-mentioned expression (5) to calculate an evaluation value. The calculated evaluation value is outputted to display unit 27 as evaluation data $V(\phi')$ for DOA. Incidentally, a portion in the integral expression of expression (5), expressed by the following;

$$W(\phi)e^{-jkr'\cos\theta}$$

may be previously calculated and stored in a memory, and the stored portion may be read from the memory when processing is actually made for expression (5).

In display unit 27, measured data $E(r,\phi)$, evaluation data $V(\phi')$, an image photographed by TV camera 17, and information on rotation angle $\phi$ and angle $\phi'$ opposite to rotation angle $\phi$ on the circumference are displayed in an appropriately combined form. In particular, since a photographing direction of the TV camera 17 coincides with a direction of angle $\phi'$, the photographing direction of TV camera 17 coincides with a direction corresponding to evaluation data $V(\phi')$. As a result, an object in the image can be easily correspondent to the evaluation data on a real-time basis, thereby is useful for specifying a noise source or an undesired electromagnetic radiation source. When the photographed image of TV camera 17 is not correspondent to the evaluation data on a real-time basis, or when TV camera 17 is not placed opposite to scanning antenna 12, the angle range for calculating the evaluation data is not required to be set in the range of $\pm 90$ degrees centered on the position opposite to rotation angle i. Rotation angle $\phi$ is a position angle for which data is presently written in ring data buffer memory 45 and forms discontinuous points in terms of time and accuracy, so that rotation angle $\phi$ is preferably not included in the range of angle for calculating the evaluation data. Thus, when the image photographed by TV camera 17 is not correspondent to the evaluation data on a real-time basis, central angle $\phi'$ in the range of the angle for calculating the evaluation data can be selected in a range expressed by the following;

$$\phi+\pi/2<\phi'<\phi+3\pi/2$$

In this embodiment, ring data buffer memory 45 is first all cleared to zero before the hologram observation is started. Each processing for measurement, writing to ring data buffer memory 45, reconstruction, and calculating the evaluation data is continuously performed in the circumference scanning for a plurality of rotations. As a result, measured data $E(r,\phi)$ can be momently displayed and evaluation data $V(\phi')$ can be displayed for the entire circumference of 360 degrees. Also, evaluation data $V(\phi')$ is updated at any time as long as scanning antenna 12 continues rotating.

When evaluation data $V(\phi')$ is acquired in at least required range of the angle, typically for one cycle of the circumference, a peak thereof is selected and zenith angle $\theta$ for the wave source is calculated from the optimal value for r' in the above-mentioned expression (8). Instead of the optimization for r', assuming that r=r' and zenith angle θ for the wave source may be derived by manipulating pedestal 14 to provide the gradient for θ in peak direction φ.

Figure 9:
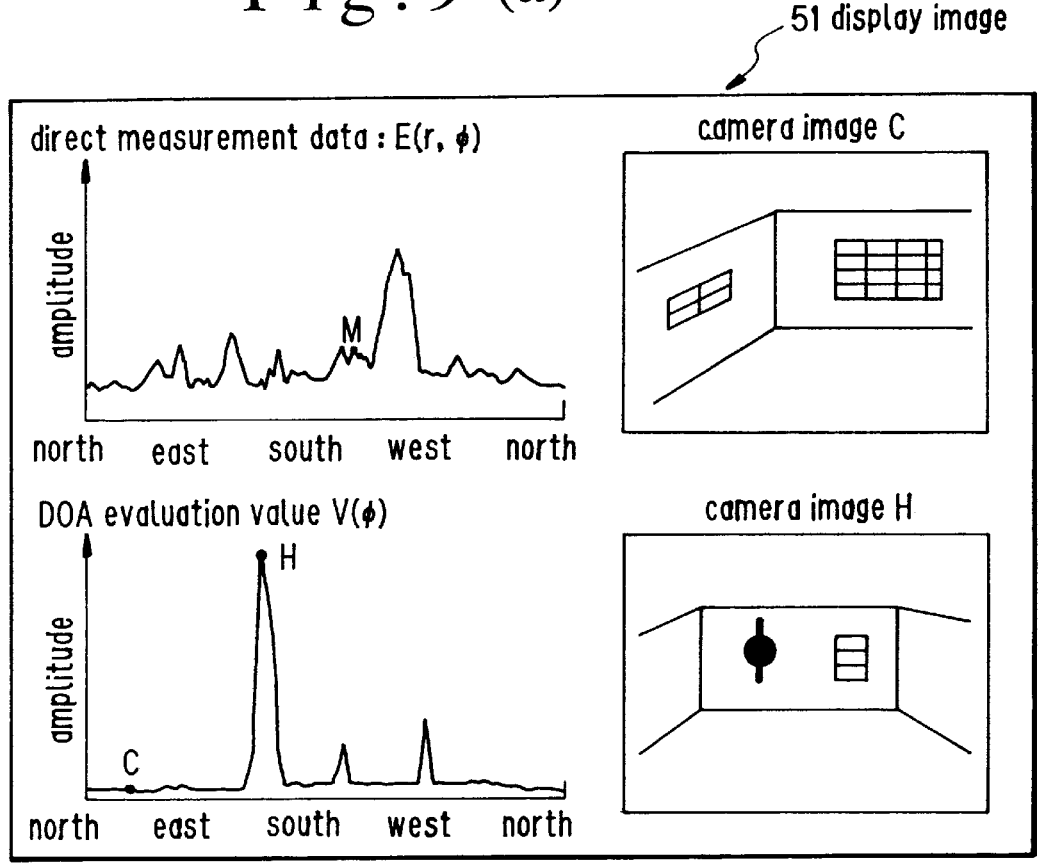
FIG. 9(a), FIG. 9(b) is a diagram illustrating an exemplary display.
Figure 9:
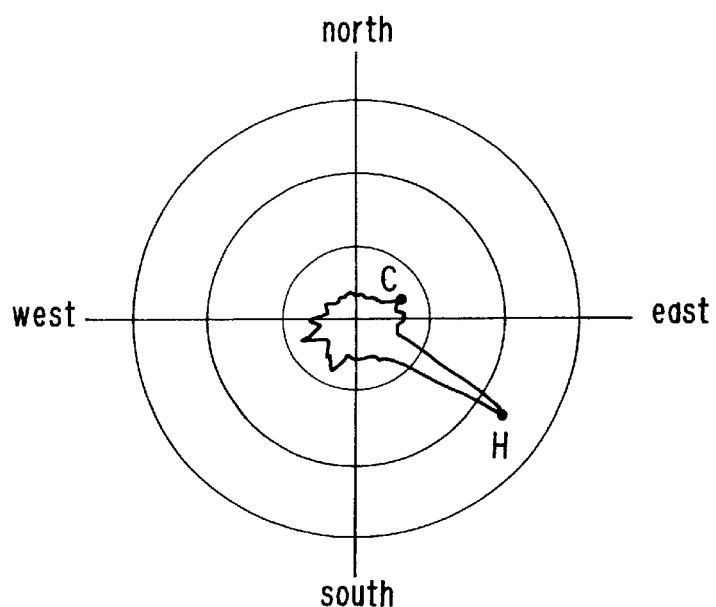

Next, an exemplary display in display unit 27 will be described with reference to FIG. 9(a) and FIG. (b). FIG. 9(a) illustrates an exemplary display screen 51 in display unit 27. Display screen 51 simultaneously shows two graphs of direct measured data E(r,φ) and DOA evaluation value V(φ), and two images of camera image C and camera image H. Each of the two graphs illustrates data for one cycle of the circumference with a horizontal axis representing the azimuth and a vertical axis representing an amplitude, respectively, in which markers are displayed as bright spots. Maker M in the graph of the direction measured data represents the present measurement position, i.e. the present azimuth φ, maker C in the graph of DOA evaluation value represents the present reconstruction position, i.e. a position opposite to maker M (direction of angle φ'), and maker H represents a peak position specified by a user for the graph of DOA evaluation value. Camera image C shows the present television image in a reconstructing direction, and is a dynamic image changing as TV camera 17 moves associated with the rotation of beam member 16. Camera image H shows an image by a camera photographing the position of maker H specified by a user in the graph of DOA evaluation value as mentioned above, and is a static image irrespective of the movement of TV camera 17. Camera image H is displayed with a marking therein (display in block color) at a wave source position based on rotation angle H corresponding to maker H and zenith angle θ.

As shown in FIG. 9(b), the measured data and the DOA evaluation value may be displayed in a radar chart form.

As mentioned above, the present invention uses the fixed sensor and the scanning sensor performing the circumference scanning, in which the interference is derived for signals received at both sensors while the scanning sensor is moved, thereby achieving an effect that all 360 degrees can be used as viewing angle without dead angle and the propagation of radio waves and acoustic waves can be evaluated on a real-time basis.

Next, a second embodiment according to the present invention will be described with reference to the drawings.

Figure 10:
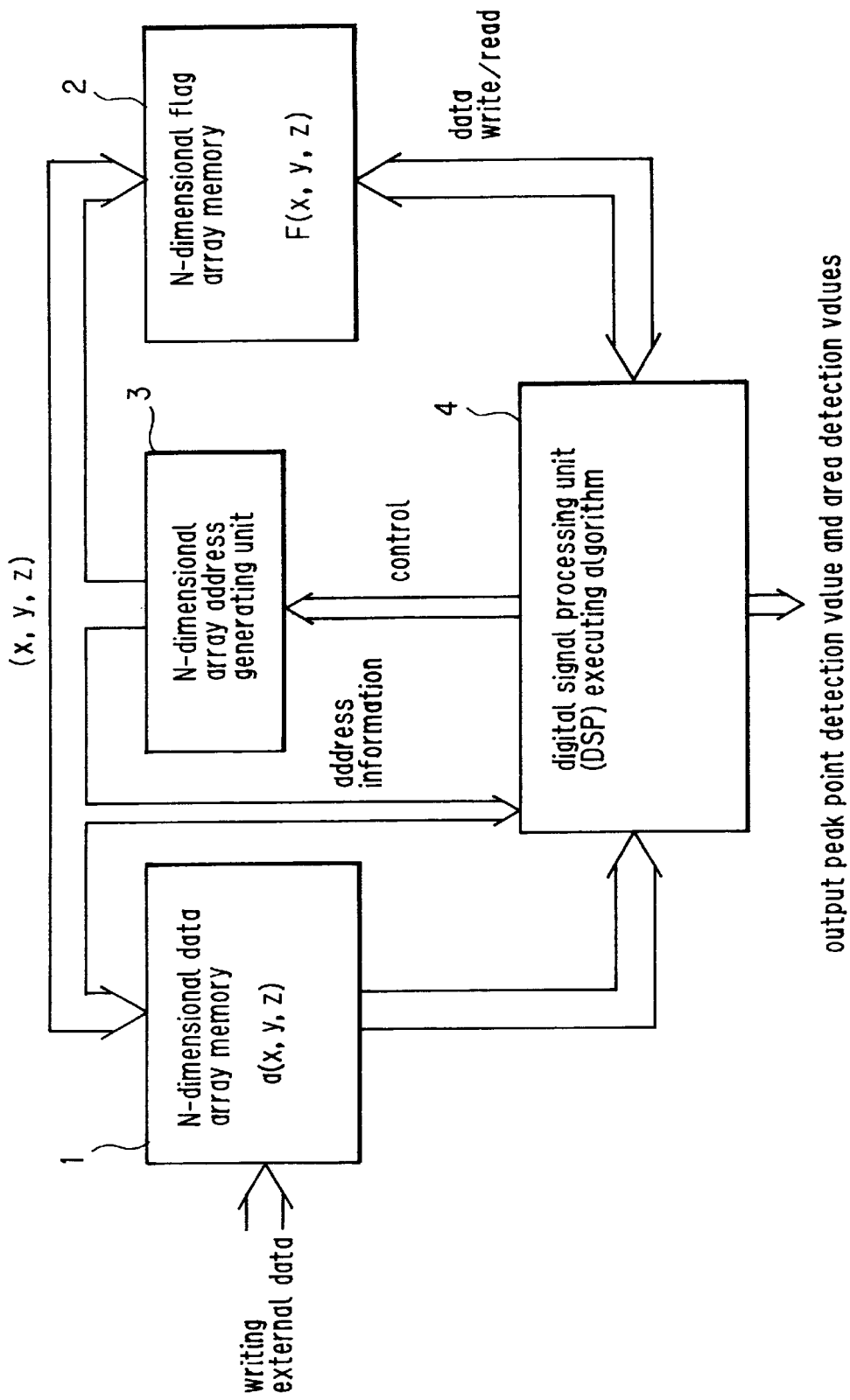
FIG. 10 is a constitutional diagram illustrating a second embodiment according to the present invention.

FIG. 10 is a constitutional diagram illustrating the second embodiment according to the present invention.

A multi-dimensional hologram data processing apparatus according to the present invention comprises N-dimensional data array memory 1, N-dimensional flag array memory 2, N-dimensional array address generating unit 3, and digital signal processing unit 4. N-dimensional data array memory 1 is written with N-dimensional array data; N-dimensional flag array memory 2 is written with N-dimensional array flag values; N-dimensional array address generating unit 3 generates addresses for the N-dimensional array data; and digital signal processing unit 4 controls N-dimensional array address generating unit 3, executes an algorithm, and outputs a peak point detection value and an area detection value.

Figure 11:
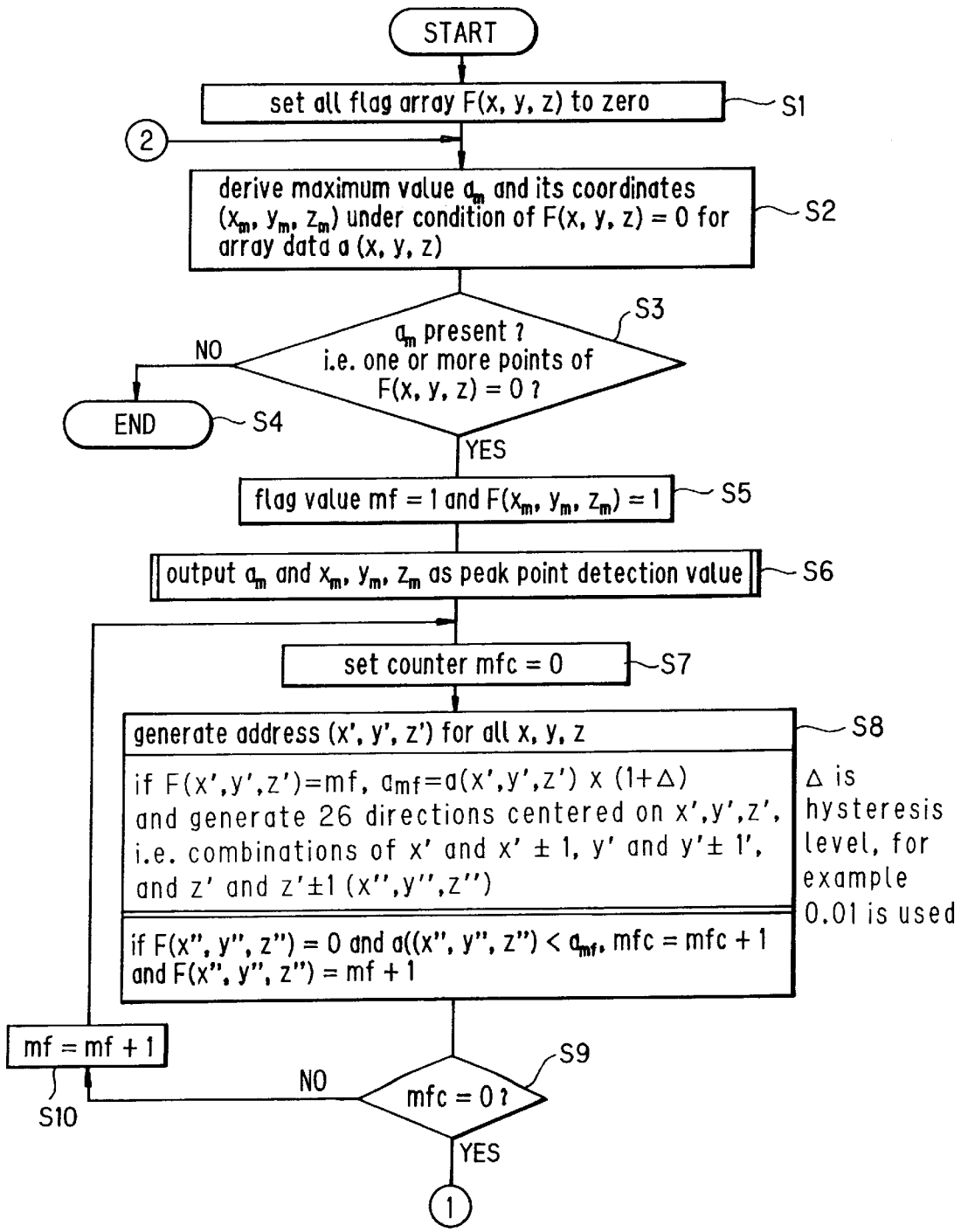
FIG. 11 is a flow chart for the second embodiment according to the present invention.
Figure 12:
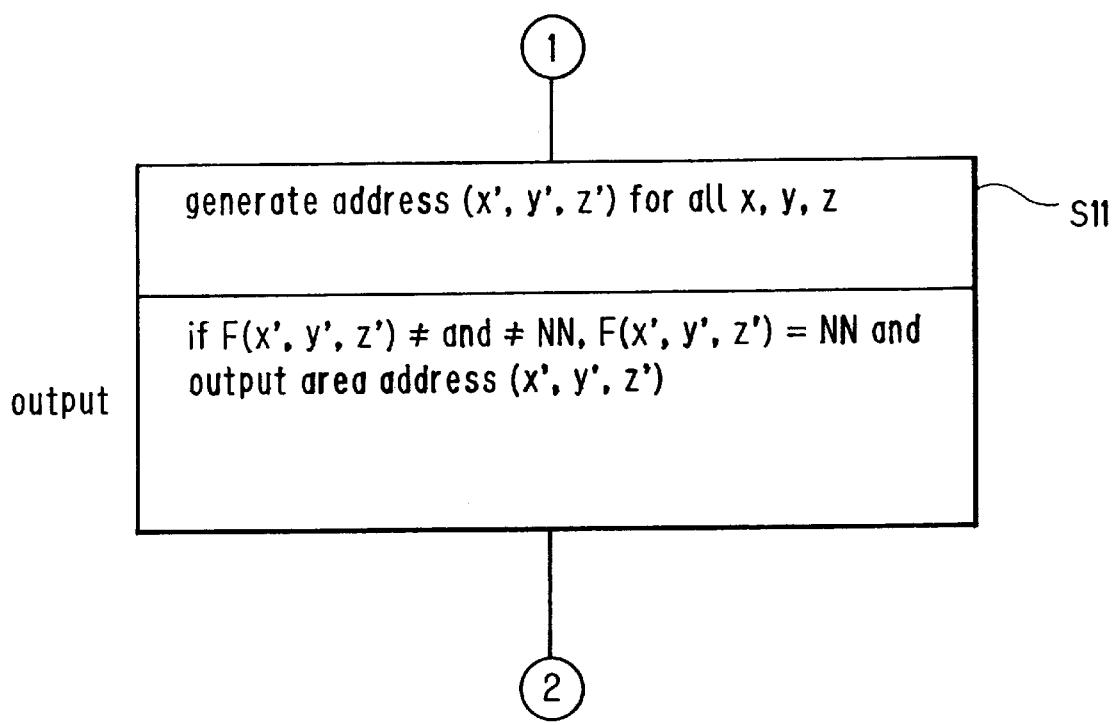
FIG. 12 is a flow chart for the second embodiment according to the present invention.

FIG. 11 and FIG. 12 are flow charts for the second embodiment according to the present invention when three-dimensional array data is utilized.

First, N-dimensional array address generating unit is used to set all the contents of three-dimensional flag array memory F(x,y,z) to zero (S1).

Next, N-dimensional array address generating unit is used to specify a value (MAX{a(xry,z)}=$a_m(x_m,y_m,z_m)$) of the three-dimensional array data providing a maximum value and address value ($x_m,y_m,z_m$) of the N-dimensional array data providing the maximum value in addresses in which a flag value represents 0(F(x,y,z)=0) (S2).

It is determined whether am is present or not, i.e. one or more point of F(x,y,z)=0 are present or not (S3). If not present, the processing is terminated (S4). If present, flag value mf is set to 1 and the content F($x_m,y_m,z_m$) in the three-dimensional flag array memory of the above-mentioned address value is set to 1 (S5).

Next, value $a_m$ of the three-dimensional array data providing the maximum value and address value ($x_m,y_m,z_m$) of the N-dimensional array data providing the maximum value are outputted as a peak point detection value (S6).

Counter mfc is set to zero (S7).

The N-dimensional array address generating unit is used to specify address value (x',y',z') in which content F(x',y',z') of the N-dimensional flag array memory coincides with flag value mf for all the addresses (S8).

All address values tangent to a circumferential direction centered on the address value are generated. In other words, if F(x',y',z')=mf, then address values in 26 directions centered on (x',y',z') are generated, assuming that $a_{mf}$=a(x',y', z')×(1+Δ), i.e. combinations of x' and X'±1, y' and y'±1, and z' and z'±1(x",y",z") are generated (S8). Δ represents a hysteresis level, for example, 0.01 is used therefor.

For the generated address values, if content F(x",y",z") of the three-dimensional flag array memory is equal to zero and three-dimensional array data value a(x",y",z") is smaller than $a_{mf}$, then 1 is added to flag value mf and counter mfc to set F(x",y",z")=mf+1 (S8).

It is determined whether counter mfc is equal to zero or not (S9). If not, mf=mf+1 is set and then the process is returned to step S7 (S10). If counter mfc is equal to zero, the process proceeds to step S11.

If content F(x',y',z') of the N-dimensional flag array memory is other than zero and does not coincide with maximum value NN representable as a flag value, the N-dimensional array address generating unit is used to rewrite content F(x',y',z') of the N-dimensional flag array memory into maximum value NN representable as a flag value for all the addresses. Address value F(x',y',z') thus obtained is outputted as an area address (S11).

Again, the process is returned to step S2.

Incidentally, hysteresis level Δ may not be set, or may be dynamically changed during execution of the algorithm.

Also, the N-dimensional array data may be expressed with a spherical coordinates system or a cylindrical coordinates system. In such a case, the end continuity may be maintained when the address values tangent to the circumferential direction are generated in step S8.

Although the above-mentioned example uses the three-dimensional array data, two-dimensional array data can be easily applied to the present invention. Similarly, four or more dimensional array data can be easily applied to the present invention.

As mentioned above, the present invention utilizes the multi-dimensional hologram data processing apparatus and the method using the same for extracting a plurality of peak points for the multi-dimensional hologram data and an area occupied thereby. Thus, the present invention has an effect that the implementation of hardware and digital signal processing (DSP) is facilitated with a simple algorithm and that the processing can be performed at a speed hundred times faster than the prior art.

Therefore, even when maps, image data, or hologram reconstruction data with a poor reconstruction resolution due to limitation on observation surfaces are used, the present invention can facilitate the extracting of image characteristics (a plurality of peak points and an area occupied thereby).

What is claimed is:

1. A hologram observation method for measuring a radiation wave from an observation object to reconstruct a hologram, comprising the steps of:

scanning a circumference by a first sensor and simultaneously receiving the radiation wave by the first sensor to generate a first received signal;

receiving a radiation wave by a second sensor placed at a position not changed with respect to a center of a circle with the circumference to generate a second received signal;

making the first received signal interfere with the second received signal to obtain an interference signal;

detecting the interference signal to obtain measured data at each point on the circumference.

2. A hologram observation method according to claim 1, further comprising the step of calculating an evaluation function $V(\phi')$ to estimate an orientation $\phi'$ of the radiation wave based on measured data $E_z(r, \phi)$ at each point in a range of half of the circumference with the following equation:

$$V(\phi') = \int_{-\pi/2}^{+\pi/2} W(\phi) e^{-2\pi j r \sin\theta \cos(\phi)/\lambda} E_z(r, \phi + \phi') d\phi$$

where a rotation angle $\phi$ represents a point on the circumference, r represents a radius of the circle, j represents an imaginary unit, $\pi$ represents ratio of circumference of circle to its diameter, $\phi'$ represents a rotation angle at a position at a center in the range of the half of the circumference, $\lambda$ represents a wavelength of the radiation wave, $\theta$ represents an incident angle of the radiation wave with respect to a central axis (z axis) of the circle, and $W(\phi)$ represents a predetermined weighting function.

3. A hologram observation method according to claim 2, further comprising the step of selecting a peak in the evaluation function $V(\phi')$ to calculate the incident angle $\theta$ from an optimal value for r·sin $\theta$.

4. A hologram observation method according to claim 2, further comprising the step of calculating the evaluation function $V(\phi')$ while a rotation axis direction of the circle is changed such that the incident angle $\theta$ is equal to 90 degrees.

5. A hologram observation method according to any one of claims 2 through 4, further comprising the step of continuously acquiring the measured data by continuously moving the first sensor on the circumference, and continuously calculating the evaluation function $V(\phi')$ based on the measured data for half of the circumference from the measured data previously obtained.

6. A hologram observation method according to claim 5, wherein a present rotation angle of the first sensor is not included in the angle range of the half of the circumference for calculating the evaluation function $V(\phi')$.

7. A hologram observation method according to claim 5, further comprising the step of photographing an image in a direction of the rotation angle $\phi'$ and displaying the image together with a display representing the calculated evaluation function $V(\phi')$.

8. A hologram observation method according to claim 6, further comprising the step of photographing an image in a direction of the rotation angle $\phi'$ and displaying the image together with a display representing the calculated evaluation function $V(\phi')$.

9. A hologram observation apparatus for measuring a radiation wave from an observation object to reconstruct a hologram, comprising:

a scanning sensor for receiving the radiation wave to generate a first signal;

a driving means for scanning a circumference by said scanning sensor;

a fixed sensor arranged at a position not changed with respect to a center of a circle with the circumference for receiving the radiation wave to generate a second signal;

an interference unit for interfering with the first received signal and the second received signal to output an interference signal; and a detector for detecting the interference signal to output measured data at each point on the circumference.

10. A hologram observation apparatus according to claim 9, wherein a trigger timing for measurement is determined based on an ID signal extracted from the second received signal.

11. A hologram observation apparatus according to claim 9, further comprising a level detecting means for calculating an average signal level from the second received signal, and a level calibration unit for performing a level calibration for the measured data based on the average signal level.

12. A hologram observation apparatus according to claim 10, further comprising a level detecting means for calculating an average signal level from the second received signal, and a level calibration unit for performing a level calibration for the measured data based on the average signal level.

13. A hologram observation apparatus according to any one of claims 9 through 12, further comprising:

a ring data buffer memory for writing the measured data therein into an address in accordance with a present rotation angle of the scanning sensor corresponding to the circumference; and an evaluation value calculating unit for calculating an evaluation function $V(\phi')$ based on the measured data $E_z(r,\phi)$ at each point in a range of a half of the circumference stored in said ring data buffer memory with the following equation:

$$V(\phi') = \int_{-\pi/2}^{+\pi/2} W(\phi) e^{-2\pi j r \sin\theta \cos(\phi)/\lambda} E_z(r, \phi + \phi') d\phi$$

where a rotation angle $\phi$ represents a point on the circumference, r represents a radius of the circle, j represents an imaginary unit, $\pi$ represents ratio of circumference of circle to its diameter, $\phi'$ represents a rotation angle at a position at a center in a range of half of the circumference, $\lambda$ represents a wavelength of the radiation wave, $\theta$ represents an incident angle of the radiation wave with respect to a central axis of the circumference, and $W(\phi)$ represents a predetermined weighting function.

14. A hologram observation apparatus according to claim 13, further comprising an offset adding unit for adding angles for half of the circumference to a present rotation angle of said scanning sensor to generate the rotation angle $\phi'$.

15. A hologram observation apparatus according to claim 14, further comprising:

a TV camera rotatably driven with said scanning sensor by said driving means with an angle distance difference for half of the circumference being maintained with respect to said scanning sensor; and a display unit for making a display of an image photographed by said TV camera, a display based on the measured data, and a display based on the evaluation function.

* * * * *

UNITED STATES PATENT AND TRADEMARK OFFICE
CERTIFICATE OF CORRECTION

PATENT NO. : 6,198,539 B1
DATED : March 6, 2001
INVENTOR(S) : Hitoshi Kitayoshi

It is certified that error appears in the above-identified patent and that said Letters Patent is hereby corrected as shown below:

<u>Title page,</u>
Item [54], Title, is incorrect.
HOLOGRAM OBSERVATION METHOD AND HOLOGRAM OBSERVATION APPARATUS AND MULTI-DIMENSIONAL HOLOGRAM DATA PROCESSING METHOD AND MULTI-DIMENSIONAL HOLOGRAM DATA PROCESSING APPARATUS Signed and Sealed this Twenty-fifth Day of December, 2001

Attest:

JAMES E. ROGAN
*Attesting Officer*     *Director of the United States Patent and Trademark Office*